Dec. 19, 1950 L. P. PETRUSCHELL 2,534,368

ELECTRIC PHONOGRAPH WITH SEPARATE STYLUS FOR RECORDING AND REPRODUCING

Filed April 24, 1947 2 Sheets-Sheet 1

INVENTOR

Lucius P. Petruschell

BY

Blair, Curtis & Hayward

ATTORNEY

Dec. 19, 1950 L. P. PETRUSCHELL 2,534,368

ELECTRIC PHONOGRAPH WITH SEPARATE STYLUS FOR RECORDING AND REPRODUCING

Filed April 24, 1947 2 Sheets-Sheet 2

INVENTOR
Lucius P. Petruschell
BY
Blair, Curtis & Hayward.
ATTORNEY

Patented Dec. 19, 1950 2,534,368

UNITED STATES PATENT OFFICE 2,534,368

ELECTRIC PHONOGRAPH WITH SEPARATE STYLUS FOR RECORDING AND REPRODUCING

Lucius P. Petruschell, Mount Dora, Fla., assignor to Dictaphone Corporation, New York, N. Y., a corporation of New York Application April 24, 1947, Serial No. 743,535

1 Claim. (Cl. 179—100.41)

This invention relates to electric phonographs and, more particularly, to an improved electromechanical translating device for use as a recorder and/or reproducer in such phonographs.

With greater particularity the invention relates to the type of recorder-reproducer disclosed in the application of Leland D. Norton, filed April 19, 1945, Serial No. 589,109, Patent 2,425,486, in which a translating unit of special design is fixedly carried by a supporting arm pivotally mounted upon a phonograph carriage in such manner that portions of separate recording and reproducing elements are combined to do double duty. In the referred to construction the translating unit comprises a double E-shaped magnet circuit structure showing a pair of permanent magnets with pole pieces providing two pairs of opposed poles adapted to cooperate selectively with either a recording stylus supporting armature laterally disposed to one side of the longitudinal axis of the supporting arm, or with a reproducing stylus supporting armature laterally disposed to the other side of said axis. The respective armatures were mounted upon a resilient torsion member so as to enable said armatures to teeter upon the middle poles of the respective magnets and transmit motion to the styli in accordance with voice currents passing through suitable coils surrounding the respective middle pole structures of the magnets. The stylus arms in the above structure were extended in opposite directions and downwardly from the respective armatures, and were bent inwardly toward the said axis so as to bring the two styli substantially in line with respect to a sound groove of a sound record with which the styli were selectively to cooperate.

A simple structure was thus provided in which the entire unit could be contained in a small space, having portions of separate recording and reproducing elements combined to do double duty, thus forming a combination with a size comparable to that of a single one of such elements and yet disposing the respective styli in line to track a record groove and separating them by a distance corresponding with the usual spacing of the recording and reproducing styli in standard stylus supporting structures.

The object of the present invention is to provide an improved translation device of the character described in which greater simplicity of structure is attained, with reduced mass of the sound responsive moving parts, and resulting increase in the natural resonance frequency thereof and superior dynamic characteristics.

Other objects will be in part obvious and in part pointed out hereinafter.

The invention accordingly consists of the features of construction, combinations of elements, and arrangement of parts as will be exemplified in the structure to be hereinafter described and the scope of which will be indicated in the following claim.

In the accompanying drawings in which is shown one of the various possible embodiments of the invention:

Similar reference characters refer to similar parts, throughout the several views of the drawings.

Figure 1:
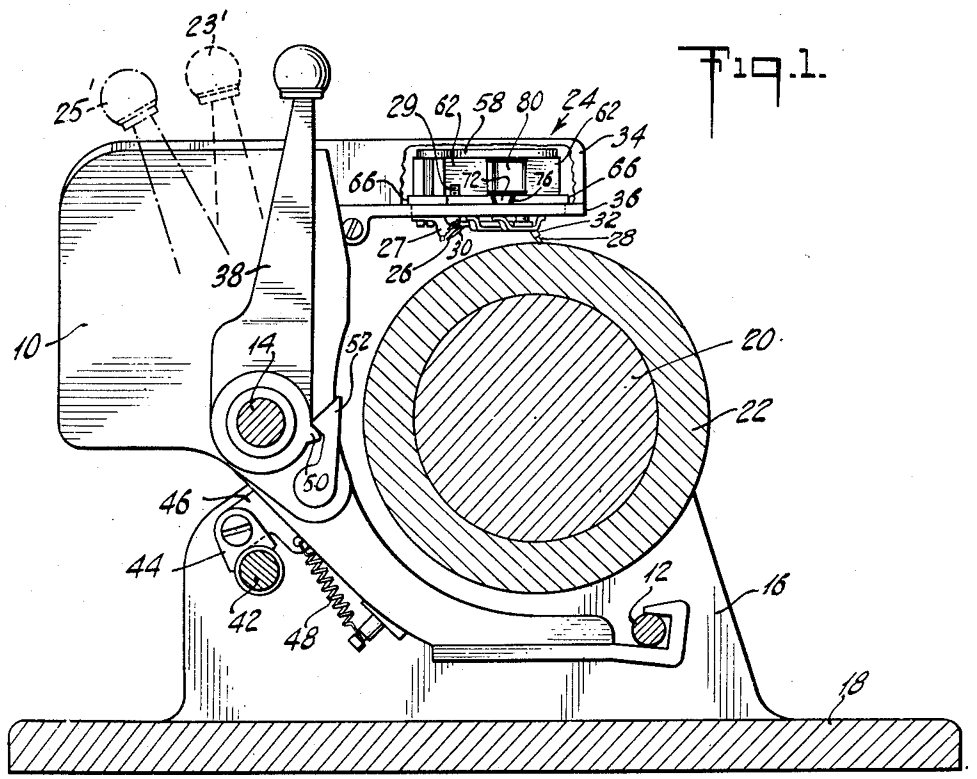
Fig. 1 is a cross-sectional view of a portion of an office dictating machine showing in side elevation a translating unit, embodying the present invention, mounted upon a standard form of carriage.

A portion of an office dictating machine for recording and reproducing office dictation is shown in Fig. 1 for the purpose of illustrating this invention. The machine has a carriage 10 mounted on guide rods 12 and 14 supported on a frame 16 attached to a base 18. A mandrel 20, adapted to support a cylindrical sound record blank 22, is suitable rotatably mounted above the base 18 parallel to the guide rods 12 and 14. An electromagnetic recorder and reproducer unit, embodying the present invention and generally indicated at 24 is supported by an arm 36 which in turn is mounted on the carriage 10 by means of a suitable pivotal positioning structure incorporated therein. This recorder-reproducer unit 24 is encased by a cover 34 and is provided with a recording stylus 26 and a reproducing stylus 28 mounted on stylus supporting arms 30 and 32, respectively, connected to the vibratory portion of the translating device 24 in the manner hereinafter to be described. The pivotal translating unit positioning structure, which secures the supporting arm 36 to the carriage 10, may be of any suitable type which permits positioning of the translating unit 24 in either "Record," "Neutral" or "Reproduce" positions by means of a control lever 38. In "Record" position it is so adjusted that the recording stylus 26 coacts with the record blank 22 to permit the formation of a sound record thereon. In "Reproduce" position the translating unit 24 is moved into such position that the reproducing stylus 28 is moved into operative position with respect to the record blank 22 so as to permit the transcribing of a sound record therefrom. In "Neutral" position the translating unit 24 is moved to a position intermediate these "Record" and "Reproduce" positions, in which position both styli of the translating device 24 are removed from operative contact with the record blank 22 to permit the record to be removed and replaced. The control lever 38 is pivotally mounted on the carriage 10 to pivot around the axis of the guide rod 14. When this control lever 38 is in the position shown in full lines in Fig. 1 the translating device is positioned for "reproducing" with the reproducing stylus 28 in contact with the record tablet 22. As this control lever 38 is moved in a counterclockwise direction, as shown in Fig. 1, it passes through a "Neutral" position, shown at 23' in dotted lines, in which the translating device is removed from contact with record 22, and thence to a "Record" position, shown in dashed lines 25', in which the recording stylus 26 of the translating device 24 is placed in contact with the record 22. A "leader ball" arrangement 27 is provided for determining the average depth of the groove formed in the record blank 22 by the recording stylus 26 and this groove depth may be set by means of an adjustment screw 29.

The usual mechanism is also provided for progressively moving the carriage 10 along the surface of the record 22 so that the recording stylus 26 may cut a spiral sound groove thereon, or the reproducing stylus 28 may follow such a spiral sound groove previously cut. This is accomplished by means of a feed screw 42 rotatably supported on the frame 16 and preferably driven by the same motor which drives the mandrel 20. A feed nut 44, pivotally mounted on a pivoted arm 46 attached to the carriage 10 and normally held against the feed screw 42 by means of a spring 48, supplies the driving connection between this feed screw 42 and the carriage 10. A cam 50 mounted on the control lever 38, is provided for temporarily disengaging the feed nut 44 from the feed screw 42 when the translating device 24 is in "Neutral" position. This cam 50 coacts with a cam follower lever 52 pivotally mounted on the carriage 10 to rotate the pivoted arm 46 to move the feed nut 44 away from the feed screw 42. Apparatus for accomplishing all of the functions just described may be any suitable apparatus, such, for example, as that shown in U. S. Patent No. 2,143,819 to Leland D. Norton, and will not be further described herein because such apparatus per se does not form a portion of the present invention.

Figures 2, 3, 4:
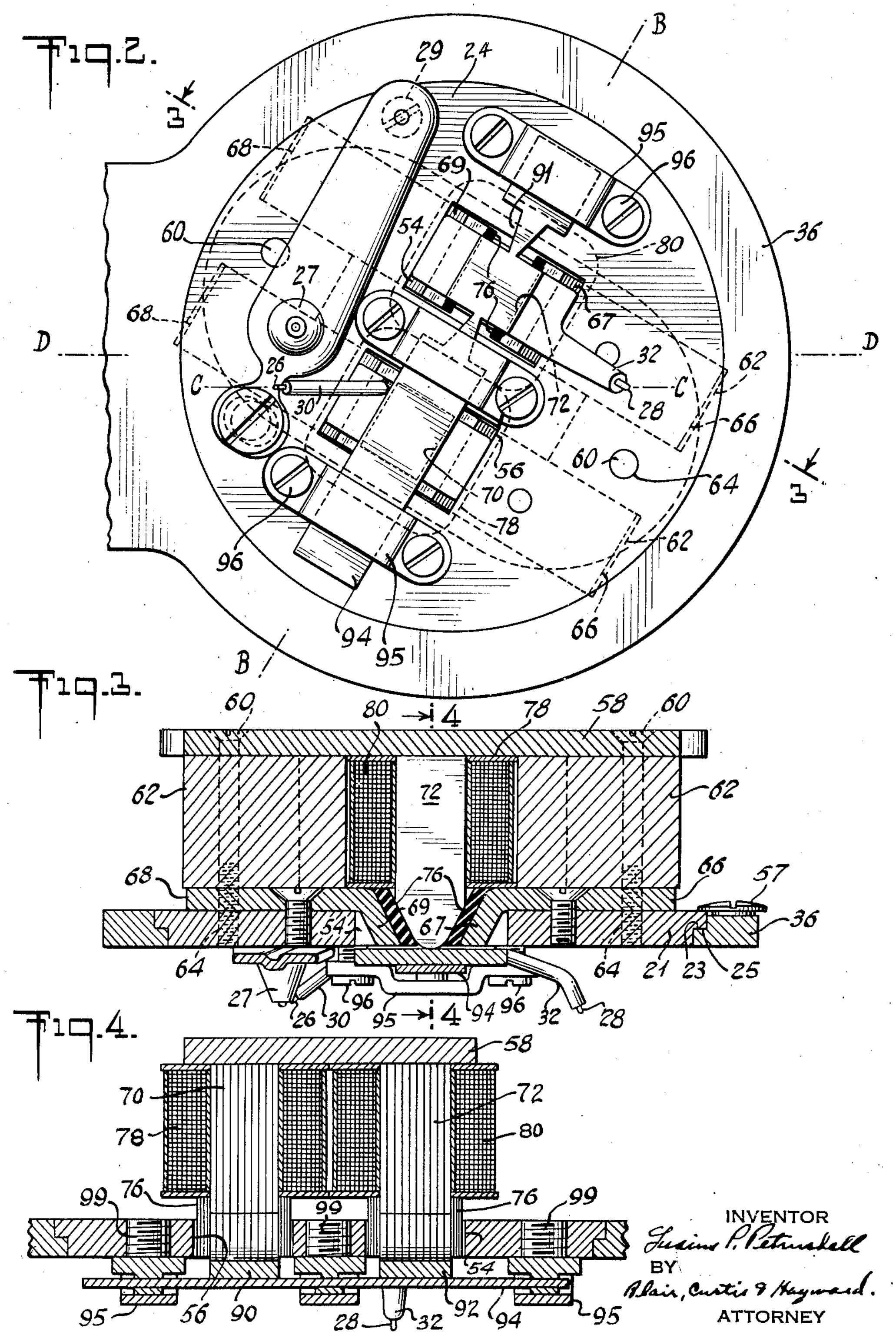
Fig. 2 is a bottom plan view of the translating unit and a portion of its supporting arm, with the unit mounted to provide an angle of about 60° between the pivot axis of the styli mounting strip and the longitudinal axis of the unit supporting arm.
Fig. 3 is a cross-section taken on line 3—3 of Fig. 2.
Fig. 4 is cross-section taken on line 4—4 of Fig. 3.

The electromagnetic recording and reproducing unit 24 can best be described by referring to Figs. 2, 3, 4 and 5. All of the elements of the translating device 24 are mounted on a circular plate 21 having an annular seat 23 cooperative with a complementary seat 25 provided at the outer end of the supporting arm 36 to furnish an angularly adjustable mounting means for the translating unit 24. These parts are made of non-magnetic material shaped generally as shown in Figs. 2, 3 and 4. The plate is provided with two rectangular slots 54 and 56 disposed at opposite sides of an axis of the plate. The translation unit is circumferentially adjustable upon the seat 25 and can be held in any desired adjustment by means of clamping screws 57.

Referring to the drawings, an E-shaped magnetic circuit structure is mounted on the annular plate 21. This magnetic circuit comprises a back plate or yoke 58 of highly permeable magnetic material secured to the supporting plate 21 by two screws 60, preferably of non-magnetic material, each of which passes down between the spaced legs of one of two U-shaped permanent magnets 62 and is threaded into a hole 64 tapped in the annular plate 21. The bottom faces of the permanent magnets 62, which magnets are oriented so that their opposite poles are adjacent the yoke 58 as well as adjacent the plate 21, rest on four pole pieces 66 and 68 arranged in pairs beneath the legs of the magnets and composes of highly permeable magnetic material. These pairs of pole pieces rest upon the plate 21 and provide tips 67, 69 bent downwardly to rest in the ends of the slots 54 and 56, respectively. In the structure thus far described, the yoke 58 forms the back portion, and the permanent magnets 62 and the pole pieces 66, 68 form the outside arms of the double E-shaped magnetic circuit structure. The center arm of this E-shaped structure is formed by two laminated rectangular core pieces 70 and 72, each made of a stack of laminations of highly permeable magnetic sheet material. One end of each of these core members 70 and 72 is square and is adapted to rest against the under side of the yoke 58. The free ends of these core pieces terminate in the form of isosceles prisms, the vertex edges of which are rounded to cylindrical surfaces as shown. These central magnetic cores are held in position against the yoke 58 with their tapered ends intermediate the pole pieces 66 and 68 by four blocks 76 of rubber or other suitable material positioned between the sloping faces of the central cores 70 and 72 and sloping parts 67 and 69 of pole pieces 66 and 68, respectively. The cylindrical tips of the magnetic cores 70 and 72 are so dimensioned as to extend through the slots 54 and 56 and between and beyond the lower surfaces of the pole pieces 66 and 68 by an amount which determines the operating air gap between the armatures and the pole pieces of the electromagnetic translating device, as will hereinafter be described in greater detail. The cores 70 and 72 are surrounded by coils 78 and 80, respectively, whereby voltages related to flux variations in the magnetic circuit can be impressed on or derived from the translating device 24. A terminal block of insulating material 82 is fastened in any suitable manner to the upper side of the supporting arm 36 and is provided with two pairs of terminals 86 and 88, to which are connected the ends of coils 78 and 80, respectively. All of these parts of the translating device are encased in the housing 34 as shown in Fig. 1.

The armature portion of this electromagnetic translating device comprises two rectangular armatures of magnetic material 90 and 92 arranged to pivot about a resilient axis and see-saw on the tips of the central cores 70 and 72. To accomplish this, these armature pieces are secured, in spaced relation, to the upper side of a strip 94 of resilient material such, for example, as Phosphor bronze, which can be best seen in detail in Figs. 2 and 6, by brazing or other suitable means. Extending from the armature pieces are respectively the stylus supporting arms 30 and 32, for the recording stylus 26 and reproducing stylus 28. This resilient strip 94 is secured to the supporting plate 21 by clamping plates 95 and screws 96, the plates straddling the strip 94 and the screws being suitably threaded into the plate 21 so as to hold the strip tightly against spacing studs 99 which extend downwardly from the plate 21 so as to provide support for the resilient strip at its ends and in the middle thereof, as shown. The studs 99 are all of equal height, just sufficient to permit pressure of the armatures 90 and 92 firmly against the cylindrical ends of the central core members 70 and 72, so that the armatures can see-saw on the ends of these core members, as is shown more clearly in Fig. 3. Thus it can be seen that the resilient strip 94 acts as a torsion-bar support or a resilient pivotal axis for the armatures 90 and 92.

As mentioned above, the amount that the central core portions 70 and 72 project beyond the pole pieces 66 and 68 determines the length of the air gap between the end portions of the armatures 90 and 92 and the pole pieces 66 and 68, respectively. This has been shown in an exaggerated amount in Fig. 3, but in actual operation it has been determined that an extension of the central core portions 70 and 72 of about four or five thousandths of an inch beyond the bottom surfaces of the pole pieces 66 provides a satisfactory air gap for efficient operation. Further, the stiffness or compliance characteristics of the translating device may be controlled by controlling the stiffness characteristics of the resilient strip 94, both by suitable choice of its composition and of its dimensions. In addition, its stiffness can be controlled by cutting lateral slots 91 therein in the manner shown in Figs. 2 and 6. By providing a width of portions of the resilient strip adjacent the recorder armature different with respect to those portions adjacent the reproducer armature, the compliance of the translating device when operating as a recorder may be made different from its compliance when operating as a reproducer.

It can be seen that the magnetic structure of the electromagnetic recorder and reproducer unit 24 just described has a yoke 58 and two permanent magnets 62 common to both the recorder and reproduced portions of the unit, but four separate pole pieces 66, 68 having two separate armatures 90 and 92 spanning the air gaps between these pole pieces and see-sawing on the central core members 70 and 72, each of which core members is surrounded by a separate winding 78 and 80, this providing separate coils and vibratory systems for recording and reproducing.

With the translating device herein described, when a signal to be recorded is applied to the recording coil 78, this signal sets up a magnetic field in the central core 70 which aids or opposes the magnetic flux produced in the circuit by the permanent magnets 62 and causes one end of the armature 90 pivoted on the end of this core 70 to be attracted to one of the pole pieces 66, 68 while the other end of the armature 90 is repelled by the other pole piece 66, 68. This alternate attraction and repulsion will occur in accordance with the variations of the signal impressed on the winding 78, thus causing the recording stylus 26 to follow the movements of the armature 90 and form a sound groove on the surface of the record 22. When the conditioning lever 38 is thrown to "Reproduce" position, moving the reproducing stylus 28 into contact with a sound groove recorded on the surface of a record blank 22, the movement of the reproducing armature 90 as it see-saws about the end of the central core element 72 in response to movements of the reproducing stylus 28 in the record groove, decreases the air gap between one end of the armature 92 and one of the pole pieces 66, 68 while it increases the air gap between the other end of this armature 92 and the other pole piece 66, 68, thus maintaining a uniform reluctance path from one pole piece 66, 68 to the other but disturbing the flux balance between the pole piece 66, 68 and the central core 72 so that there is an alternation of the magnetic flux passing through the central core piece 72. This, in turn, induces a corresponding voltage in reproducing coil 80 which surrounds this central core 72 and thus provides a signal corresponding to the undulations of the sound record groove on record tablet 22.

One of the objections to the construction shown in Patent No. 2,425,486, Serial No. 589,109, referred to at the beginning of this specification, is that the fixed positions of the unit armatures upon either side of the axis of the supporting arm for the unit does not lend itself to simplicity in arranging the two styli so that they will track in line with respect to the record sound groove. In order to make their tracking distance apart correspond to standard practice it is necessary to make the supporting arms of considerable size and mass and of very irregular conformation. Thus the mass of each oscillating part of the unit is greater than is consistent with the desirability of securing a satisfactory natural resonance thereof.

Figures 5, 6:
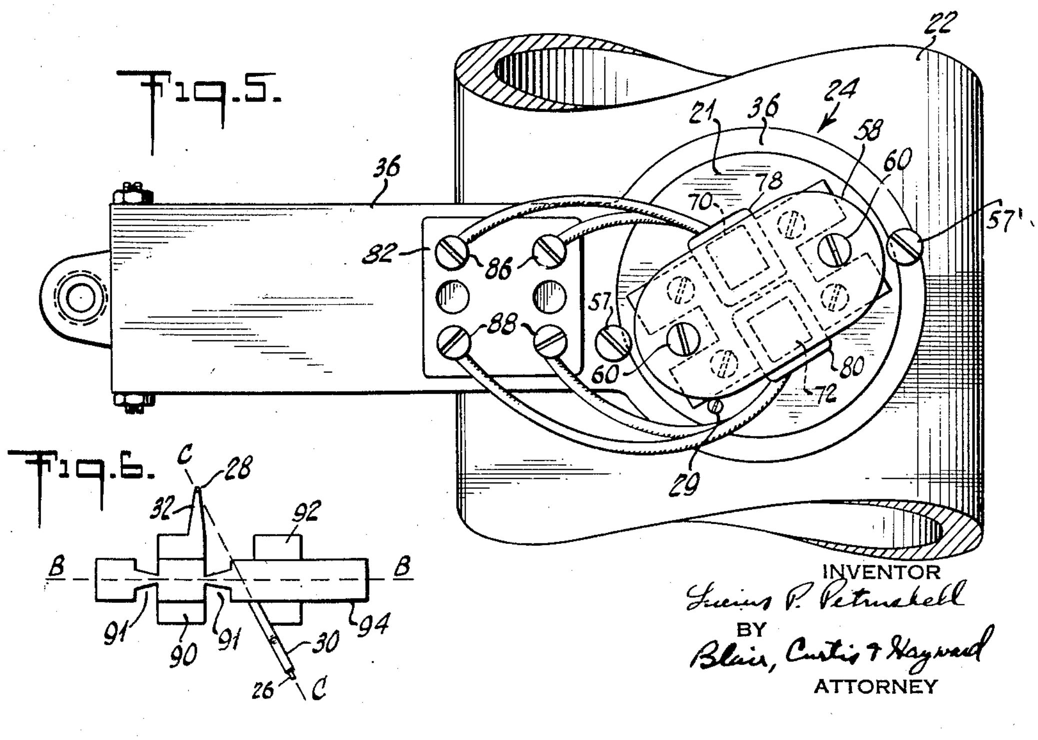
Fig. 5 is a top plan view of the unit supporting arm and unit disposed in operative relation above a record cylinder broken away both sides of the unit.
Fig. 6 is a detail bottom plan view of the resilient armature supporting strip, showing the armatures supported thereon, and the angular relation of a line passing through the two styli to the pivot axis of the strip.

The above disadvantage has been overcome in the present construction by mounting the styli so that the line connecting them, shown as C in Fig. 6, makes a predetermined angle of a value between 0° and 90° with the axis B of the resilient strip, and mounting the supporting plate 21 of the unit upon the annular seat provided by the supporting arm 36 so that the axis line B of the strip makes a corresponding angle with the longitudinal axis D—D of the supporting arm. As shown herein, that angle is about 60°, but if it is desired to establish slightly different resonance conditions the angle may be selectively varied within the range of 0° to 90° mentioned above. This permits considerable leeway in respect to the proportions and positions of the stylus supporting structure which may be employed without departing from the principles of the invention, while, at the same time maintaining the tracking distance apart of the respective styli within satisfactory conformity with the standard practice in this respect.

As many possible embodiments may be made of the above invention and as many changes might be made in the embodiments above set forth without departing from the scope thereof, it is to be understood that all matter hereinbefore set forth or shown in the accompanying drawings is to be interpreted as illustrative only and not in a limiting sense.

I claim:

In a sound recording and reproducing machine, in combination, an electromagnetic translation device for recording a sound track upon a record member and for reproducing a sound wave previously recorded upon said track, comprising an elongated resilient armature supporting torsion member having one portion, means whereby said one portion is formed to oscillate freely about the torsion axis of said member in accordance with sound waves received by said translation device, a second portion, means whereby said second portion is formed to oscillate freely about the same axis in response to operative contact with a previously recorded sound track, a recording stylus and a reproducing stylus for alternatively making contact with said sound track, means comprising an armature and integral stylus holder for securing said recording stylus to the said one portion of said torsion member, means comprising an armature and integral stylus holder for securing said reproducing stylus to said second portion of said torsion member, means whereby said stylus holders are so disposed with respect to one another that a line connecting said styli in a plane parallel to the bottom of the resilient armature supporting member forms an angle substantially less than 90 degrees with said axis of oscillation of said oscillatory portions of said torsion member; a supporting arm for said translation device having a longitudinal axis normal to its pivotal axis, means whereby said supporting arm is pivotally mounted and adjustable means whereby said translation device may be mounted upon said supporting arm in such position that the line connecting the styli will lie in parallel relation with the said longitudinal axis of the supporting arm.

LUCIUS P. PETRUSCHELL.

REFERENCES CITED

The following references are of record in the file of this patent:

UNITED STATES PATENTS

| Number | Name | Date |
|---|---|---|
| 1,744,047 | Keller | Jan. 21, 1930 |
| 1,816,831 | Dunning | Aug. 4, 1931 |
| 1,992,893 | Thomas | Feb. 26, 1935 |
| 2,107,050 | Bender | Feb. 1, 1938 |
| 2,195,758 | Rysick | Apr. 2, 1940 |
| 2,318,308 | Harris | May 4, 1943 |